(No Model.)
2 Sheets—Sheet 1.
W. E. ELAM.
SEED COTTON FEEDER.
No. 508,376.   Patented Nov. 7, 1893.
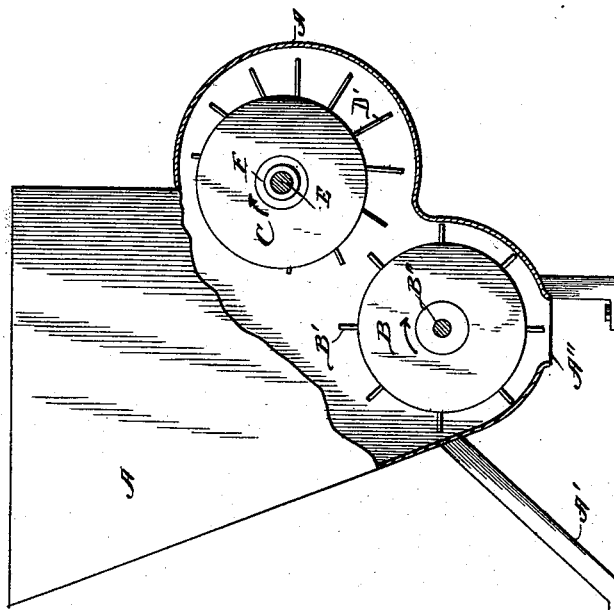
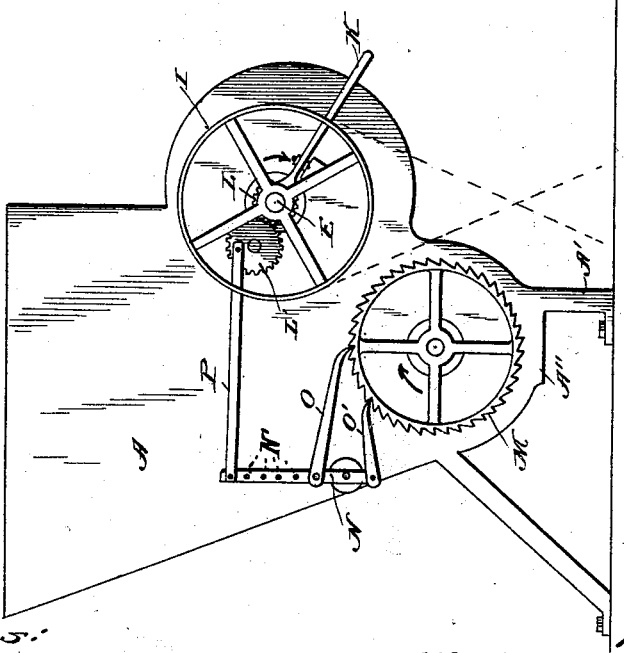

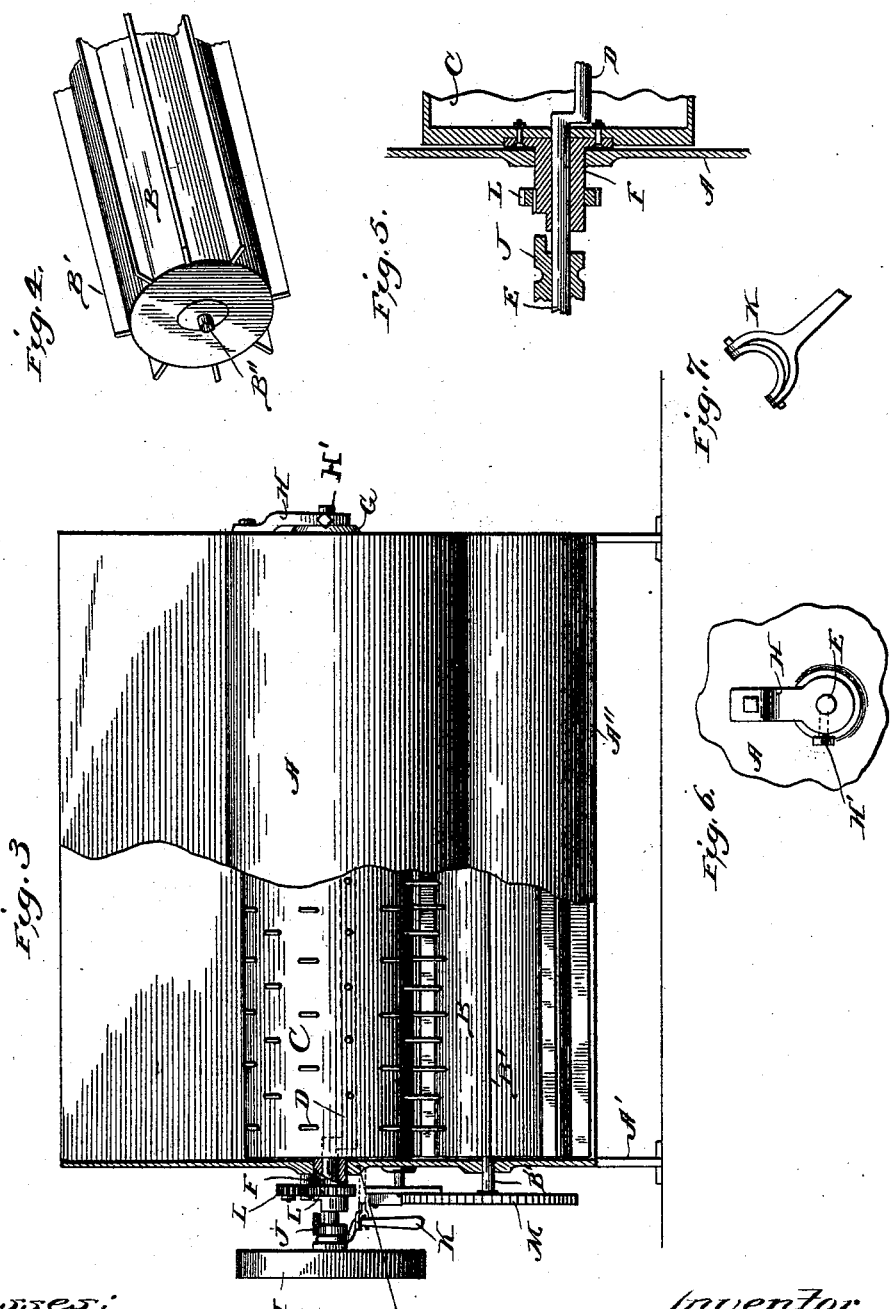

UNITED STATES PATENT OFFICE.

WILLIAM ERWIN ELAM, OF DALLAS, TEXAS, ASSIGNOR OF TWO-THIRDS TO ROBERT S. THOMAS AND SAUNIE W. HARDWICK, OF SAME PLACE.

SEED-COTTON FEEDER.

SPECIFICATION forming part of Letters Patent No. 508,376, dated November 7, 1893.

Application filed March 20, 1893. Serial No. 466,774. (No model.)

*To all whom it may concern:*

Be it known that I, WILLIAM ERWIN ELAM, a citizen of the United States, residing at Dallas, in the State of Texas, have invented certain new and useful Improvements in Cotton-Gin Feeders; and I do hereby declare the following to be a full, clear, and exact description of the invention, such as will enable others skilled in the art to which it appertains to make and use the same.

A gin feeder commonly used at the present time has an endless belt conveyer to carry the cotton forward, and is provided with some one or more of many additional devices to regulate the amount delivered by the conveyer, independently of the amount that may be in the feeder, provided only that the supply be not too scanty. Some of these feeders deliver cotton to the gin with almost perfect regularity, but they are complicated and wear rapidly and hence are often out of order.

The object of this invention is to simplify and improve the common feeder, and these ends are sought in dispensing with the belt conveyer and in using various novel constructions and expedients, as will hereinafter appear.

In the drawings,—Figure 1 is an end elevation of the complete feeder. Fig. 2 is a like view with a portion of the end removed to show internal construction. Fig. 3 is a side elevation looking to the left in Fig. 2. Fig. 4 is a perspective view of the feed cylinder. Fig. 5 is an axial section of a certain spiked cylinder. Fig. 6 shows the bearings seen at the right in Fig. 3. Fig. 7 is a detail of a certain clutch operating lever.

The feeder box A is constructed of any suitable material and is shown as provided with short legs A' which are intended to be fixed to the top of a gin. The box is open at the top and has below an opening surrounded by a short pendent tube A" through which cotton drops directly to the gin. In or over this opening is mounted a cylinder B provided with radial wings B' with which the ends of the box and the cylinder itself form pockets to receive the cotton above and discharge it below as the rotation of the cylinder brings the pockets successively into an inverted position over the open passage to the gin. At one side of the cylinder and a little above it is mounted a spiked cylinder C that rotates in the same direction with its spikes sweeping near the edges of the wings B' to throw upward and backward all cotton that projects from the pockets. From the construction it follows that if the supply of cotton in the cylinder be sufficient, the pockets will all be filled but will carry no excess beyond the spikes of the cylinder C; and if the supply of cotton in the box be kept up by any means whatever the gin will be fed uniformly at a rate depending wholly on the speed of rotation of the feeding cylinder B. Practically, cotton would collect on the spikes of an ordinary spiked cylinder and moreover would be carried by them into the space between the spikes and the walls of the box and unless the space were made very great clogging would occur. To avoid these evils the construction is such that the spikes are alternately projected and retracted so that they act when needed and disappear where they are not desired. This result is accomplished by mounting the spikes D' upon the offset portion D of a fixed bent shaft E whose end portions are in the axis of revolution of the cylinder C. The spikes swing bodily about the middle portion of the bent shaft being carried by the cylinder, which is a shell having a series of spirally arranged apertures for the spikes, and is provided with hollow end gudgeons F that project through the walls of the box and rotate with the cylinder about the end portions of the fixed shaft E. These gudgeons may have outer bearings G fixed to the walls of the box, and the bent shaft may conveniently be secured in the desired position by the bracket H, fixed to the side of the box, and the set screw H' seen in Figs. 3 and 6. At the opposite end of the box the fixed shaft projects some distance beyond the gudgeon and bears a loose driving pulley I, actuated by a belt from the gin or other convenient source of power. Connected with the hub of this pulley is a clutch sleeve J that engages with the gudgeon F when the pulley is thrown inward, as it may be by means of a forked lever K pivotally mounted upon the side of the box. Between the clutch and the box is a gear L fixed to the gudgeon and engaging a second gear L' which rotates on a short shaft projecting from the side of the box. The shaft B" of the feed cylinder B also projects through the wall of the box and is provided with a ratchet wheel M. Motion is transmitted from the spiked cylinder to the feed cylinder by means of a lever N pivoted to the side of the box and bearing at its lower end two pawls O, O' which engage the ratchet wheel and at its upper end with a pitman P connected to a wrist pin upon the gear L'. Now as the gear rotates, the lever is pushed rearward by the pitman and the ratchet is forced by the pawls to rotate forward; but an instant later the continued rotation of the gear draws the lever forward at the upper end and causes the pawls to slip over the teeth of the ratchet. The distance through which the ratchet and the connected feed cylinder rotate each time may be varied by varying the relative length of the lever arms, which may be done by changing the pitman connection from one to another of the holes N' in the lever N. The clutch-actuating lever K (Fig. 7) has a half ring pivotally mounted in its forked end and adapted to fit in a groove in the clutch sleeve, and as the lever swings in throwing the clutch into or out of engagement, there is no binding in the groove but the ring adjusts itself slightly upon its pivots and at all times presses squarely against the walls of the groove.

The operation of the machine may be briefly stated as follows: The parts being properly adjusted, the driving pulley is set in motion and the clutch is thrown into engagement. Motion is thus imparted to the spiked cylinder and, through the gears L, L', pitman P, lever N, pawls O, O', and ratchet wheel M to the feed cylinder B. By any suitable means cotton is discharged into the feeder box where it rests upon the cylinder B and fills the pockets. The intermittent rotation of the cylinder carries the pockets in succession beneath the spiked cylinder whose spikes sweep back cotton lying above or without the limits of the pockets. The further rotation of the feed cylinder brings the pockets, successively, into an inverted position over the passage leading to the gin, and as the motion is step by step, ample time is afforded for gravity to empty each pocket. The speed of the driving pulley and of the pitman-operating gear is originally fixed at such a rate as to give an average rate of feed, and the adjustment of the pitman upon the lever gives all the variation from this rate that is practically desirable.

The mounting of the spikes upon the bent shaft is similar to the arragement shown and described in many patents for example, in Elam et al., No. 414,762, dated November 12, 1887, and it has not been thought necessary to give it in detail.

It may be observed that the spiral arrangement of the spikes aids in distributing the cotton from end to end of the cylinders; that the offset in the fixed shaft is so located that the spikes cease to project from the cylinder at the point where they pass from the body of the box, and that they therefore carry no cotton past this point; that the rotation of the two cylinders being in the same direction, the spikes and pocket wings roll the cotton over gently but continuously, although the spikes move constantly and rapidly while the feed cylinder moves at intervals and on the whole much more slowly; and that although cotton may appear ill suited to be carried in such pockets, experience shows that it is not, but that the apparatus feeds the gin with the greatest accuracy and uniformity.

What I claim is—

1. The combination with a feeder box open at the bottom for discharging directly to a gin, of a cylinder obstructing the opening and provided with peripheral pockets to receive cotton falling in the box, means for imparting rotary motion to said cylinder, and means for sweeping in a contrary direction cotton projecting from said pockets.

2. The combination with a feeder box having an opening at the bottom, of a rotary cylinder obstructing said opening and provided with peripheral pockets, and a rotary spiked cylinder mounted in the box alongside the cylinder first named to sweep back cotton projecting from said pockets.

3. The combination with a downwardly-open feeder box, a winged cylinder obstructing the opening, and a spiked cylinder mounted alongside the winged cylinder, of means for continuously rotating the spiked cylinder, and pawl and ratchet mechanism arranged to be actuated by the rotation of the spiked cylinder and to transmit step by step rotary motion to the winged cylinder.

4. The combination with the downwardly open feeder box, of the winged cylinder obstructing the downward passage of cotton through the bottom opening, means for rotating said cylinder, a second cylinder provided with automatically projecting and retracting spikes, and means for imparting rotary motion to said second cylinder.

5. The combination with the feeder box and the feed cylinder provided with the peripheral pockets, of a second cylinder having the hollow end gudgeons and mounted alongside the first upon a fixed shaft, the spikes intermittently projecting from the cylinder last mentioned, the loose pulley upon said shaft, clutch mechanism for connecting said pulley to one of said gudgeons, and pawl and ratchet mechanism actuated by the rotation of said second cylinder and transmitting intermittent motion to the feed cylinder.

In testimony whereof I affix my signature in presence of two witnesses.

WILLIAM ERWIN ELAM.

Witnesses:
S. H. McBRIDE,
WM. HIDDEL.